United States Patent
Tokuyama et al.

(10) Patent No.: US 6,452,751 B1
(45) Date of Patent: Sep. 17, 2002

(54) MAGNETIC HEAD SLIDER AND A MAGNETIC DISK DEVICE IN WHICH THE SLIDER IS MOUNTED

(75) Inventors: Mikio Tokuyama, Tsukuba; Mieko Ishii, Tsuchiura; Ryuji Tsuchiyama, Matsudo; Youichi Kawakubo, Tokyo; Hiromitsu Tokisue, Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/102,679

(22) Filed: Mar. 22, 2002

Related U.S. Application Data

(63) Continuation of application No. 09/299,909, filed on Apr. 28, 1999, now Pat. No. 6,373,661.

(30) Foreign Application Priority Data

Apr. 28, 1998 (JP) .......................................... 10-118181

(51) Int. Cl.[7] .............................................. G11B 17/32
(52) U.S. Cl. .................................................... 360/236.6
(58) Field of Search ................ 360/234.3, 235.1–235.3, 360/236.5–236.8

(56) References Cited

U.S. PATENT DOCUMENTS

| 5,841,608 | A | 11/1998 | Kasamatsu et al. |
| 5,917,678 | A | 6/1999 | Ito et al. |
| 5,978,176 | A | 11/1999 | Ezaki et al. |
| 5,991,118 | A | 11/1999 | Kasamatsu et al. |
| 6,188,547 | B1 * | 2/2001 | Gui et al. ................ 360/236.6 |
| 6,191,923 | B1 * | 2/2001 | Tokuyama et al. ....... 360/236.6 |
| 6,243,233 | B1 * | 6/2001 | Yamamoto et al. ...... 360/236.6 |
| 6,246,538 | B1 * | 6/2001 | Kasamatsu et al. ..... 360/236.6 |

FOREIGN PATENT DOCUMENTS

| JP | 4-28070 | 1/1992 |
| JP | 6-325530 | 11/1994 |
| JP | 7-21717 | 1/1995 |
| JP | 9-245451 | 9/1997 |

* cited by examiner

*Primary Examiner*—Allen Cao
(74) *Attorney, Agent, or Firm*—Antonelli, Terry, Stout & Kraus, LLP

(57) ABSTRACT

A magnetic head slider having a magnetic head for reading/writing information from/into a magnetic disk and a slider on which the magnetic head is mounted. The slider has three surface portions with levels which are different from each other on a surface facing to the magnetic disk including a first surface portion forming a pad surface, a second surface portion having a level which is lower than a level of the first surface portion and a third surface portion having a level which is lower than that of the second surface portion. The second surface portion is provided at a side opposite to a side on which the magnetic head is mounted and the third surface portion is provided at the side on which the magnetic head is mounted. A projection is provided on the second surface portion.

18 Claims, 9 Drawing Sheets

ENLARGEMENT OF PORTION A

MAGNETIC HEAD SLIDER AND A MAGNETIC DISK DEVICE IN WHICH THE SLIDER IS MOUNTED

CROSS REFERENCE TO RELATED APPLICATION

This is a continuation of U.S. application Ser. No. 09/299,909, filed Apr. 28, 1999, U.S. Pat. No. 6,373,661 B1 the subject matter of which is incorporated by reference herein.

BACKGROUND OF THE INVENTION

1. Field of the Invention

The present invention relates to a magnetic head slider for a magnetic disk device and also to a magnetic disk device, and more particularly to a magnetic head slider of a low flying height-type for achieving high reliability and high-density recording and also to a magnetic disk device having such a magnetic head slider.

2. Description of the Related Art

In magnetic disk devices, attempts have now been made to achieve a low flying height design of a slider and also to stabilize a flying height For example, as disclosed in JP-A-6-325530, there has been proposed a slider in which a surface (step surface) structured by a step extending in a recessing direction from a flat surface portion of a rail for flying (air bearing rail) is formed at an inflow-side portion of the rail of the slider, and the depth of this step surface (that is, the height of the step) is made microscopic so that a predetermined flying height of the slider can be achieved without depending on the peripheral speed of a disk. In this known example, the rail for flying has the step surface provided at the inflow-side portion, the step, and the flat surface portion extending from this step portion, and the depth of the step surface (that is, the height difference between the step surface and the flat surface portion) is not more than 700 nm, and by doing so, there can be provided the slider which can fly with a predetermined flying height without depending on the peripheral speed of the disk. A slider, having a step of such a microscopic depth (height), will be hereinafter referred to as "microscopic step slider".

JP-A-7-21717 discloses a slider in which two inflow pads and one outflow pad are provided on the slider, and side edges of the pads are inclined to an angle generally equal to a predicted maximum inclination so that even on a smooth magnetic disk, the slider can be disposed in linear contact with the magnetic disk, thereby preventing the sticking of the slider to the disk.

Further, in order to achieve the above-mentioned low flying height design of the slider, the disk surface is made flat and smooth. The mean surface roughness Ra of a currently-used disk is reduced to not more than 10 nm. There has been adopted a contact start stop system (hereinafter referred to as "CSS system") in which when the rotation of a magnetic disk is stopped, a slider is held in contact with a disk surface, and when the disk is rotated, the slider flies off the disk surface. In a device using this CSS system, a so-called sticking problem arises from a smooth disk surface, and more specifically, when the rotation of the disk is stopped, the slider sticks to the disk surface. When the slider sticks to the disk, there are encountered troubles such as the failure of the disk to rotate. In order to solve this problem, a slider, in which microscopic projections are formed on the slider to reduce the area of contact between the slider and the disk, is disclosed in JP-A-4-28070 and JP-A-9-245451.

In a microscopic step slider as disclosed in the above JP-A-6-325530, a sticking problems arises from a smooth disk surface. In order to avoid this sticking problem, even if microscopic projections as disclosed in JP-A-4-28070 and JP-A-9-245451 are provided on a rear portion or front and rear portions of the flying rail, or a negative-pressure pocket thereof, the following problems are encountered:

(1) If the flying rail of the slider or the microscopic projection is brought into contact with the disk surface for some reason at the time of CSS or during the flying of the slider over the rotating disk, the flying surface (surface facing the disk) of the slider is pulled by a frictional force, so that the slider is turned or angularly moved about a pivot (load-acting point) of a suspension to lean forward, and as a result the front edge of the step surface of the slider is brought into contact with the disk surface. The front edge of the step surface is sharp, and when this front edge is brought into contact with the disk surface, there arises a problem that the disk is damaged by this front edge. Particularly in a magnetic disk device of the type in which the flying height of the slider is small, and the smooth disk is used for the purpose of achieving a low flying height, this problem is serious because of the large frictional force. Therefore, to prevent the slider from leaning forward so that the front edge will not brought into contact with the disk surface is an important subject matter for preventing damage to the disk and for securing the reliability, One method of overcoming this problem is to chamfer the front edge of the step surface (to provide a curvature) to increase the contact area, thereby reducing a contact stress (load pressure). With this method, however, an opening of the step surface (that is, the distance of the step surface from the disk surface) is large, and an increased amount of dust and dirt enter this opening, which leads to a possibility that the flying height is varied. When the flying height is thus varied, an error in the data reading and writing operation occurs. Therefore, this method is not effective in preventing the damage of the disk by the front edge (sharp edge portion) of the step surface.

(2) Another main factor in the variation of the flying height of the slider is a reduction of the atmosphere pressure. More specifically, when the magnetic disk device is used at a place of a high altitude, the pressure of the atmosphere is low, so that the flying height is reduced. When the flying height is reduced, there arises a problem that the slider comes into contact with the disk to damage the same. To reduce the amount of reduction of the flying height of the slider due to the decrease of the atmospheric pressure is an important subject matter for achieving the low flying height design of the slider and also for preventing the contact of the slider with the disk so as to secure the reliability.

And besides, when the microscopic projection is provided on the rail of the slider, the reduction of the flying height is, in some cases, limited depending on the height of this projection, so that there is a case that the low flying height design can not be achieved.

OBJECT AND SUMMARY OF THE INVENTION

It is therefore an object of the present invention to provide a magnetic head slider in which even when the slider is leaned forward, a front edge of each step surface is prevented from being brought into contact with a disk surface, and besides the amount of reduction of the flying height of the slider due to a decrease of the atmospheric pressure is reduced, thereby enabling the reading and writing of data in a stable manner, and to provide a magnetic disk device of a high reliability.

In order to achieve the above object, and in order to prevent a step slider from leaning forward and a front edge of each step surface from coming into contact with the disk surface, rails for flying (stepped pads) each structured to have a step surface are provided on a slider, and microscopic projections are formed on the step surface disposed at an inflow-side portion of the slider. The height of the microscopic projections are substantially equal to or higher than the depth (height) of the step. And besides, because of the provision of the microscopic projections, a variation of the flying height due to the decrease of the atmospheric pressure can be reduced.

The microscopic projections are formed on the step surface of the rail of the slider of the invention. The front edge of the step surface is provided at a position substantially coincides with the inflow end of the slider.

DESCRIPTION OF THE PREFERRED EMBODIMENTS

A first embodiment of the present invention will now be described with reference to FIGS. 1 to 6 and FIG. 14.

Figure 1:
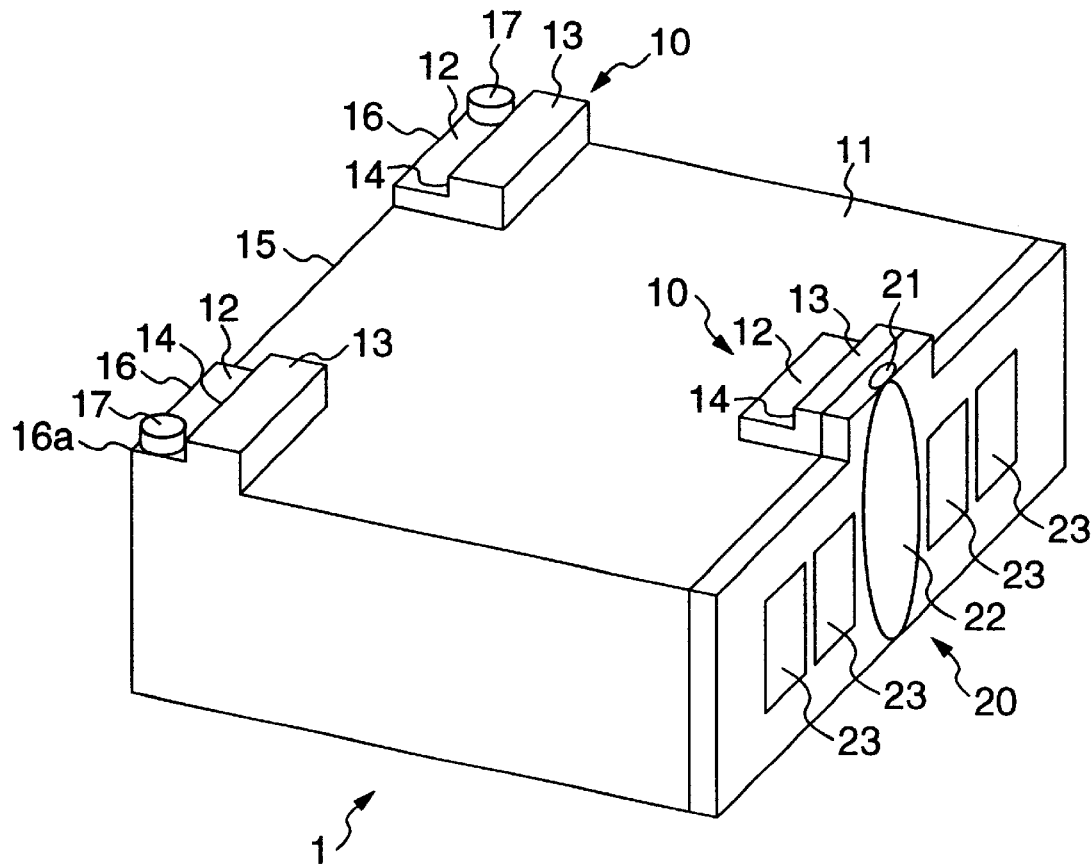
FIG. 1 is a perspective view of a first embodiment of a slider of the invention, showing a flying surface thereof.

FIG. 1 is a perspective view of one embodiment of a slider of the invention, showing a flying surface thereof.

Three pads for flying 10 for producing a flying force are formed on a bleed surface 11 of the slider 1. Two of these pads 10 are provided respectively at opposite ends of an inflow-side portion (to which an air stream, produced in accordance with the rotation of a disk, flows) of the slider 1, and the other pad 10 is provided at a central portion of a an outflow-side portion of the slider 1. Each flying pad 10 has a flat surface portion 13, a step portion 14 (defined by a surface disposed generally perpendicular to the flat surface portion 13) facing the air stream inflow side, and a step surface 12. The flat surface portions 13 of the three flying pads 10 lie generally in a common horizontal plane. The step surface 12 is disposed generally parallel to the flat surface portion 13, and structured to have a microscopic depth (the step portion 14) in a direction generally perpendicular to the flat surface portion 13. The step surfaces 12 of the three flying pads 10 lie generally in a common horizontal plane. A microscopic projection 17 is formed on the step surface 12 of each of the two inflow-side pads 10. The microscopic projection 17 is disposed near an outer corner portion 16a of the step surface 12. The slider 1 is provided with a thin-film magnetic head 20 provided rearward of the flat surface portion 13 of the outflow-side pad 10. A gap portion 21 of the magnetic head 20 is disposed generally in a plane in which the flat surface portion 13 lies. A coil portion 22 and lead terminals 23 are provided at the outflow end surface of the slider 1.

In this embodiment, the flying pads each having the step are used in order to achieve the same effect as attained with the conventional flying rail having an inclined portion at the air inflow side. Namely, the flying pads each with the step are used in order to obtain a large flying force.

One example of specific numerical values in this embodiment are as follows. The slider 1 has a length of 1.2 mm, a width of 1 mm and a thickness of 0.3 mm. The size of each of the step surface 12 and the flat surface portion 13 of the flying pad 10 is 0.4 mm×0.1 mm, and the height of the step portion 14 is 0.09 $\mu$m. The height from the flat surface portion 13 to the slider surface (that is, the depth (height) of the bleed 11) is 6 $\mu$m. The microscopic projection 17 has a cylindrical shape, and its diameter is 0.06 mm, and the height of this projection 17 from the step surface 12 is 0.13 $\mu$m. Therefore, the microscopic projection 17 projects 0.04 $\mu$m beyond the flat surface portion 13. The slider 1 is not limited to the above dimensions, and there is a tendency for these dimensions to become more microscopic.

Figure 2:
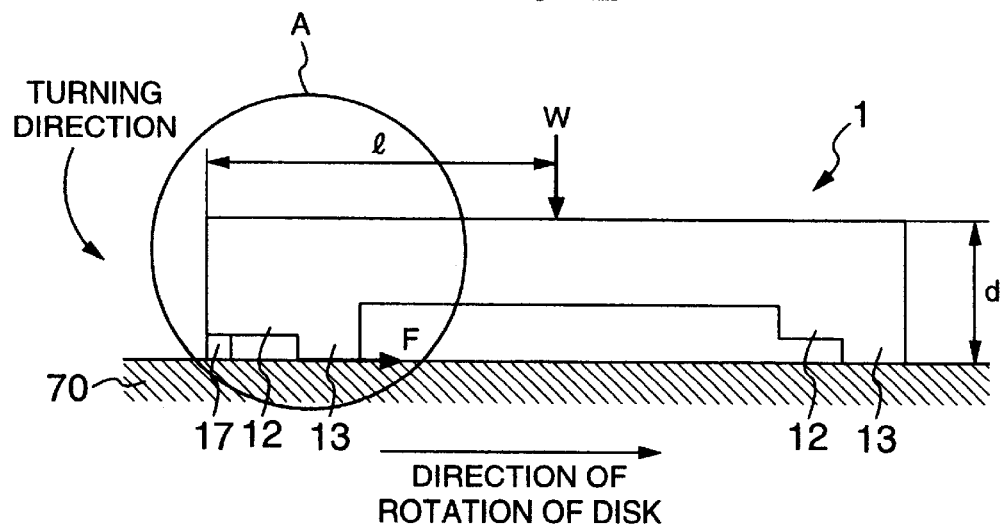
FIG. 2 is a view explanatory of the condition for the forward leaning of the slider by a frictional force.
Figure 3:
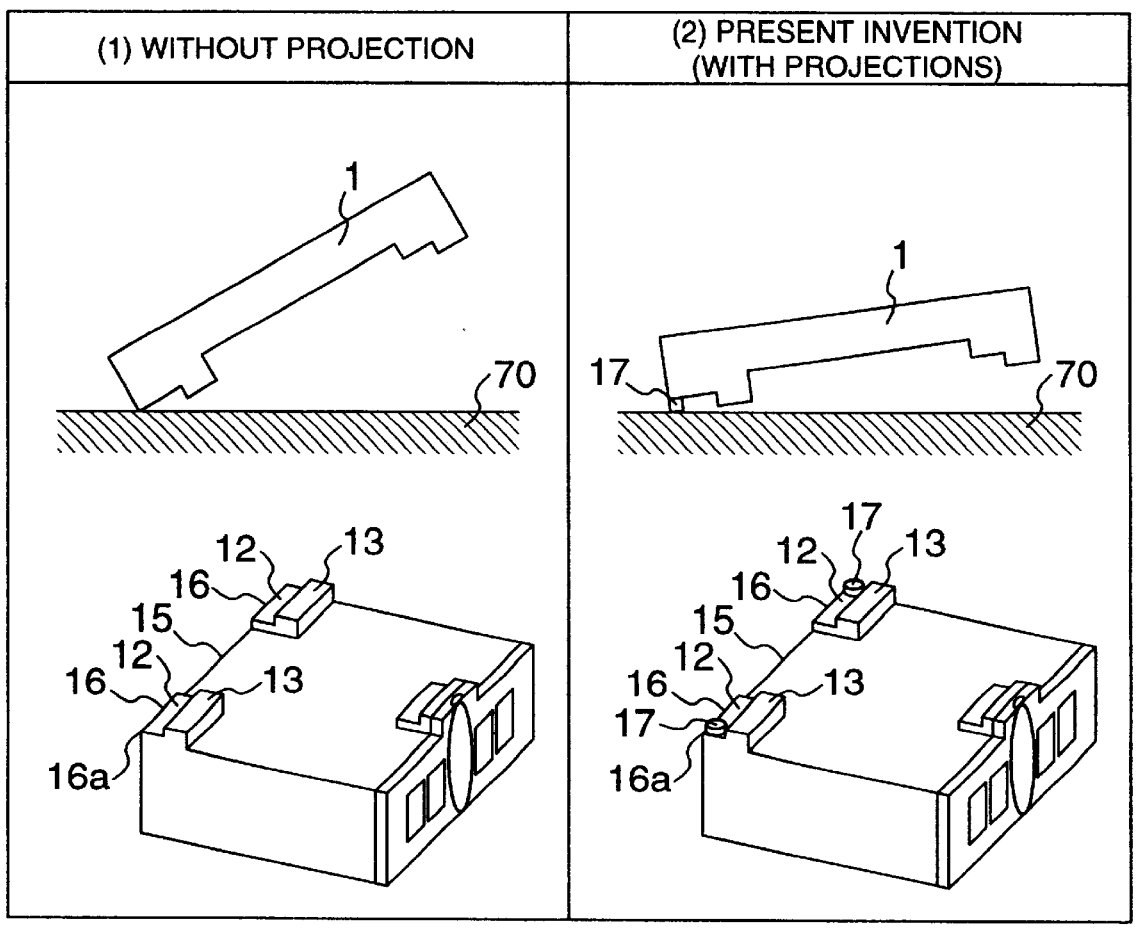
FIG. 3 is a view explanatory of the function of microscopic projections.

Effects of the present invention will now be described with reference to FIGS. 2 and 3. FIG. 2 is a side view of the magnetic head slider of the present invention. FIG. 3 shows the slider with the microscopic projections and the slider without the microscopic projections, showing a contact condition between the slider and a magnetic disk.

If the slider is brought into contact with a rotating magnetic disk 70 for some reason during the flying of the slider 1 or at the time of CSS, a force as shown in FIG. 2 is exerted at a point of contact between the slider 1 and the magnetic disk 70. Although not shown in the drawings, a pressing force, acting in a direction toward the magnetic disk, is exerted on the slider 1 from a pivot of a suspension. When a moment Mf due to a frictional force F between the slider 1 and the magnetic disk 70 becomes larger than a turning moment Mw due to the pressing load applied to the slider 1 by the suspension, the slider 1 is turned about the pivot to lean forward, so that the front edges of the step surfaces are brought into contact with the disk surface.

The condition for the forward leaning of the slider 1 is Mw<Mf. Here, there are established formulas, Mw=W×l and Mf=F×d where W represents the pressing force applied to the slider by the suspension, l represents the distance from the pivot (load acting point) to the point of contact (axis of the turning movement) between the slider 1 and the magnetic disk 70, F represents the frictional force between the slider 1 and the magnetic disk 70, and d represents the thickness of the slider 1.

As will be appreciated from the above formulas, in order to prevent the forward leaning of the slider, it is effective to increase the pressing load W, or to increase the distance l from the pivot to the point of contact between the slider and the disk, or to reduce the thickness d of the slider. However, the increase of W increases the amount of wear between the slider and the disk at the time of CSS, and this is not desirable. For reducing the thickness d of the slider 1, the size of the magnetic head also need to be reduced, and this is difficult. Therefore, it is effective to increase the value of l.

If the microscopic projection 17 is formed on the step surface of each of the flying pads provided at the inflow-side portion of the slider as shown in FIG. 2, Mw increases so that the slider 1 is less liable to be turned to lean forward. More specifically, assuming that the overall length of the slider is represented by L, the length of the step surface is represented by ls, the pivot is disposed generally at the center of the slider, and the microscopic projection 17 is provided at the center of the step surface, the following is obtained:

If the turning moment of the conventional microscopic step slider is represented by Mw1, the following formula is established:

$$Mw1 = W \times (L/2ls) \quad (1)$$

If the turning moment of the microscopic step slider of the present invention is represented by Mw2, the following formula is established:

$$Mw2 = W \times (L/2) \quad (2)$$

In the present invention, the microscopic projection 17 is provided on each step surface 12 at the inflow side. Therefore, the axis of turning (angular movement) of the forwardly-leaning slider 1 is the point of contact between each microscopic projection 17 and the magnetic disk 70. The condition for the turning of the slider 1 is represented by formula (2) as described above. On the other hand, the conventional slider has no microscopic projection 17, and therefore the boundary between the step surface 12 and the flat surface portion 13, that is, the inflow end of the flat surface portion 13, serves as the axis of turning of the slider (that is, the point of contact with the magnetic disk). Therefore, the value of l is reduced by an amount corresponding to the length is of the step surface 12, so that the slider is liable to lean forward. In other words, if the microscopic projection 17 is formed on the step surface 12 as in the present invention, the value of l is increased, so that the slider 1 is less liable to lean forward.

As will be appreciated from the above formulas, by providing the microscopic projection on the step surface of each inflow-side pad, the moment can be increased, so that the slider is less liable to lean forward.

In the present invention, there is achieved an advantage (effect) that even when the slider leans forward, the slider is less liable to damage the surface of the magnetic disk. If any microscopic projection 17 is not formed on the step surface 12 as shown in FIG. 3(1), the slider is liable to be leaned forward by the frictional force F as described above. When the slider thus leans forward, the front edge 16 of the step surface 12 is brought into contact with the surface of the magnetic disk 70 to damage the same. In order to prevent the intrusion of dust and dirt and also to reduce the depth Ds of the step surface 12, the front edge 16 of the step surface 12 is formed into a sharp edge. Therefore, when the slider 1 is brought into contact with the surface of the magnetic disk, a contact stress can easily exceed a stress limit of the magnetic disk surface, thereby damaging the magnetic disk.

If the magnetic disk is thus damaged, an error in the information reading and writing operation occurs, thus adversely affecting the reliability of the device.

On the other hand, in the case where the microscopic projection 17 is formed on the step surface of each inflow-side pad, the microscopic projection 17 is brought into contact with the magnetic disk 70 when the slider 1 leans forward as shown in FIG. 3(2), and the front edge 16 of the step surface 12 will not be brought into contact with the surface of the magnetic disk 70. The contact area of the microscopic projection 17 is so small that the microscopic projection 17 hardly damages the magnetic disk surface. As shown in the drawings, the height of the microscopic projection 17 need only to be so determined that the corner portion of the flat surface portion 13 will not be brought into contact with the disk surface, and this height may be smaller than the height of the flat surface portion 13.

When the slider without any microscopic projection is leaned forward while turned in the direction of the width (transverse direction), the corner portion 16a of the front edge 16 of the step surface 12 is brought into contact with the disk surface. The contact of the corner portion 16a with the disk surface is more liable to damage the disk surface than the contact of the front edge 16 with the disk surface is. On the other hand, in the case where the microscopic projection 17 is formed on the outer end portion of the step surface 12, the microscopic projection 17 is brought into contact with the surface of the magnetic disk 70, and the corner portion 16a will not be brought into contact with the surface of the magnetic disk 70. Therefore, in the present invention, even when the slider 1 is leaned forward upon contact with the magnetic disk 70, damage to the magnetic disk 70 can be prevented.

Figure 4:
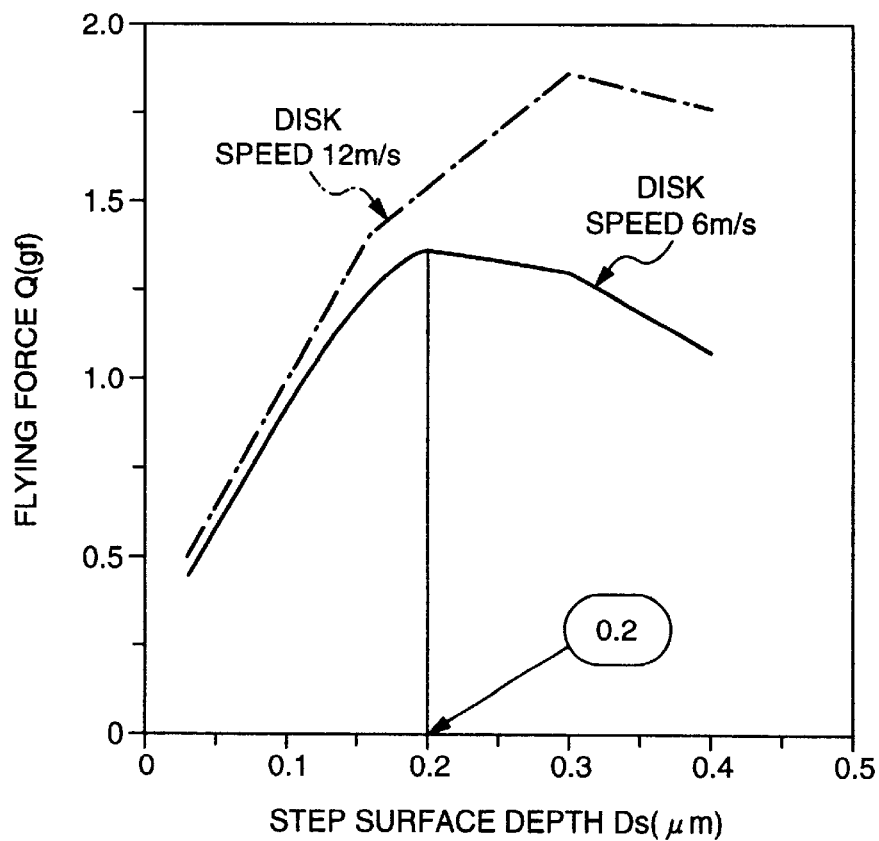
FIG. 4 is a diagram showing the relation between the depth of a step surface and a flying force.

The relation between the depth Ds of the step surface (which is the height difference between the flat surface portion 13 and the step surface 12) and the flying force Q was obtained by calculation, and results thereof are shown in FIG. 4. With respect to conditions of the calculation, the length of the slider was 1.25 mm, its width was 1.0 mm, the size of the step surface 12 of the flying pad was 0.3 mm×0.25 mm, the size of the flat surface portion 13 was 0.3 mm×0.05 mm, and the height from the flat surface portion to the bleed 11 was 6 $\mu$m. The flying height of the air inflow end of the slider was 30 nm, and the flying height of the air outflow end thereof was 90 nm, and the height Ds of the step portion was used as a parameter, and the calculation was made.

As will be appreciated from FIG. 4, the smaller Ds becomes, the smaller the difference between the flying force at the disk speed of 6 m/s and the flying force at the disk speed of 12 m/s becomes. As Ds decreases from 0.3 $\mu$m to 0.2 $\mu$m, the difference of the flying force due to the difference of the speed abruptly decreases. When Ds becomes not more than 0.2 $\mu$m, the difference of the flying force Q becomes not more than 10%. This value is sufficiently smaller as compared with a variation of the flying force Q due to processing and assembling errors and so on. Therefore, if Ds is not more than 0.2 $\mu$m, the stable flying can be achieved. In this embodiment, the value of Ds is 0.2 $\mu$m, and therefore there can be obtained the slider in which the predetermined flying force Q is obtained without depending on the peripheral speed of the disk, and a variation in the flying height is small, and the flying height is constant over the entire circumference of the disk.

This effect is not changed even if the depth of the bleed (the height from the slider surface to the flat surface portion 13 of the pad) relative to the flying pad is changed. The smaller the depth Ds of the step portion 14 is made than 0.2

μm, the smaller the difference of the flying force due to the difference of the peripheral speed becomes. With the compact design of the slider, the flying force Q tends to be small. However, if the height Ds of the step portion 14 is 0, this pad has no step, so that the flying force is not produced. Therefore, in view of variations in the processing of the slider, the minimum value of Ds should be so determined that it will not become 0.

Figure 5:
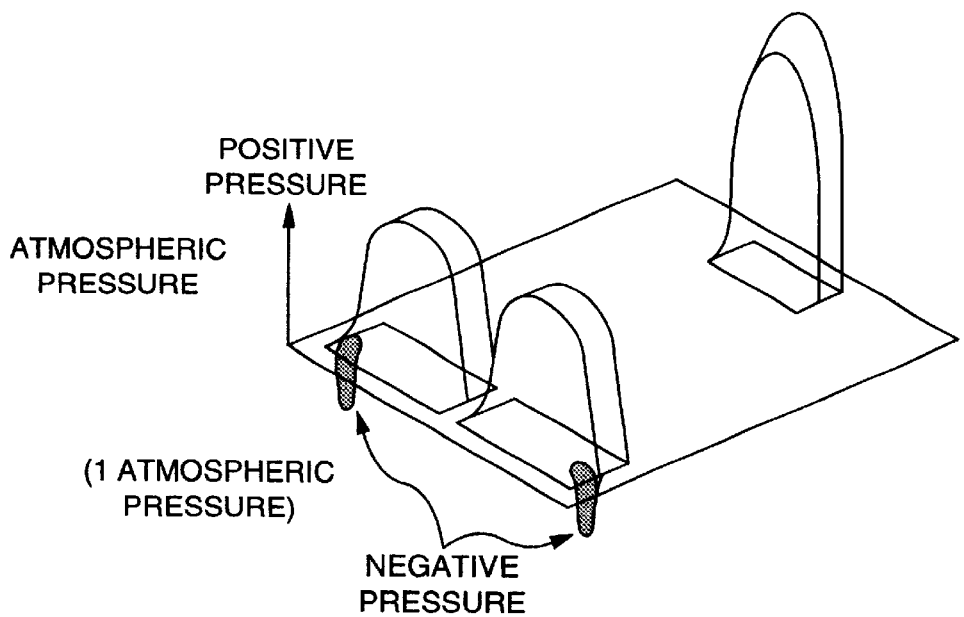
FIG. 5 is a view showing a pressure distribution of the slider.

FIG. 5 shows a pressure distribution on the flying surface of the slider with the microscopic projections, which pressure distribution was obtained by calculation.

By providing the microscopic projection 17 on the step surface 12, the amount of reduction of the flying height can be reduced even if the ambient atmospheric pressure decreases. More specifically, in the case where the magnetic disk device is used at a place with an altitude of 3,000 m, the ambient atmospheric pressure is smaller than the ordinary atmospheric pressure (1 atmospheric pressure), so that the flying height of the slider is reduced. Therefore, conventional sliders need to have a separate negative pressure-producing mechanism in order to prevent the reduction of the flying height. In the slider of the present invention, having the microscopic projection 17 formed on the step surface 12 of each inflow-side pad, a negative pressure-producing region is formed rearward of each microscopic projection 17, as shown in FIG. 5. Therefore, any separate negative pressure-producing portion as in the conventional sliders is not needed. Therefore, the amount of reduction of the flying height due to the altitude difference (between 0 m and 3,000 m) can be made smaller as compared with the sliders having no microscopic projection 17.

It has been confirmed through calculation that the amount of reduction of the flying height in the construction of this embodiment is not more than about ½ of that obtained in the slider having no microscopic projection 17.

Although explanation of the detailed mechanism is omitted here, the following relation is established among the flying height Fs of the slider, the load W and the negative pressure Fn. The slider flies with the flying height satisfying this relation.

$$Fs=W+Fn \tag{3}$$

In this embodiment, as the atmospheric pressure decreases, the flying force Fs decreases as in the conventional sliders, and at the same time the negative pressure Fn decreases. Therefore, the flying height of the slider will not be changed in accordance with the decrease of the atmospheric pressure. This effect is achieved by forming the microscopic projection on the step surface of a microscopic depth (height) as described above. And besides, there is achieved an advantage that a variation of the flying force due to a change in the peripheral speed of the disk can be reduced as in the conventional slider utilizing a negative pressure.

Figure 6:
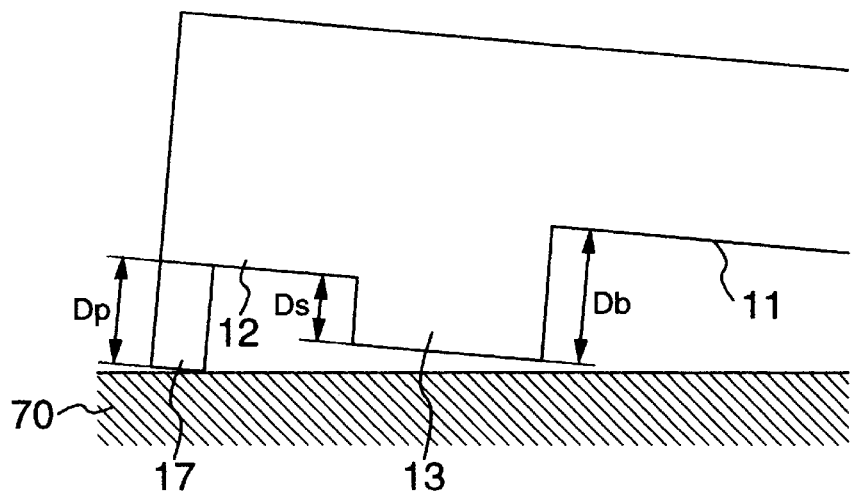
FIG. 6 is an enlarged view of a portion A of FIG. 2.

FIG. 6 shows a portion A of FIG. 2 on an enlarged scale. In FIG. 6, however, the microscopic projection 17 projects beyond the flat surface portion 13 of each inflow-side pad. As shown in FIG. 6, the microscopic projection 17 is formed on the step surface 12, and the height Dp of the microscopic projection 17 is higher than the height Ds (the depth Ds from the flat surface portion 13 to the step surface 12) from the step surface 12 to the flat surface portion 13, and therefore the microscopic projection 17 is held in contact with the surface of the magnetic disk 70. Therefore, the flat surface portion 13 of each flying pad 10, having the microscopic projection 17, is held out of contact with the magnetic disk 70. The area of contact between the flat surface portion 13 and the magnetic disk 70 can be arbitrarily changed by adjusting the height Dp of the microscopic projection 17.

In this embodiment, the microscopic projection 17 is higher than the flat surface portion 13, and therefore the flat surface portion 13 of each air inflow-side flying pad 10 will not be brought into contact with the surface of the magnetic disk 70. The flying pad 10, provided at the air outflow-side of the slider, does not come into contact with the magnetic disk 70 at its flat surface portion 13 over the entire area thereof, but come into contact with the magnetic disk at its flat surface portion 13 at a predetermined inclination angle. Therefore, the area of contact between the slider 1 and the disk 70 is greatly reduced. It is known that a sticking force, by which the slider sticks to the disk, is proportional to the area of contact between the two. In this embodiment, the area of contact is further reduced by the provision of the microscopic projections 17, the sticking force is reduced.

Next, the dimensions of the various portions in this embodiment will be described. As described above, the depth (height) Ds from the flat surface portion 13 to the step surface 12 is set to 0.09 μm. The relation between this depth and the flying force will be described later. The depth Db from the flat surface portion 13 of the flying pad 10 to the bleed surface 11 is 6 μm. For the purpose of reducing the processing amount, the bleed depth Db is made as small as possible in such a range that the bleed surface will not produce a flying force, but the value of Db is not limited to 6 μm. The height Dp of the microscopic projection 17 is larger than Ds, and therefore Dp>0.09 μm is provided.

The diameter of the microscopic projection 17 is 0.06 mm. If this diameter is too small (for example, not more than 0.01 mm), the microscopic projection 17 is worn upon contact with the magnetic disk. In contrast, if this diameter is too larger (for example, not less than 0.1 mm), the microscopic projection 17 sticks to the magnetic disk. Wear and the sticking vary depending on the surface roughness of the magnetic disk surface.

In this embodiment, the amount of projecting of the microscopic projection 17 beyond the flat surface portion 13 toward the magnetic disk surface is 40 nm (Dp−Ds=0.13 μm−0.09 μm). The height Dp of the microscopic projection 17 is so determined that the projecting amount (Dp−Ds) is smaller than the flying height of the flat surface portion 13, and is larger than the roughness of the magnetic disk surface. If the mean surface roughness Ra of the magnetic disk surface is 2 nm, the maximum surface roughness Rmax is 6 nm which is about three times larger than Ra, and therefore the projecting amount should be not less than 6 nm.

The slider is inclined, and therefore with respect to the flying height ho of the air outflow-side flying pad and the flying height hi of each air inflow-side pad, the gap ratio (hi/ho) is usually 2 to 8. In this embodiment, hi/ho=3 is provided, and ho=20 nm and hi=60 nm are provided. Therefore, even though the projecting amount is 40 nm, the microscopic projection will not come into contact with the rotating magnetic disk.

For the above reasons, if the flying height is made microscopic, the projection height Dp need to be reduced so as to avoid the contact of the microscopic projection with the magnetic disk. Also, the projecting amount (Dp−Ds) need only to be larger than the maximum surface roughness Rmax (=3Ra), and therefore Dp may be reduced if Rmax is small.

As described above, the microscopic projection 17 is formed on the step surface 12 of each inflow-side flying pad, and therefore the forward leaning of the slider is prevented, and besides even if the slider is leaned forward, damage to the disk is prevented. Furthermore, the reduction of the flying height due to the decrease of the ambient pressure is prevented, and also the sticking force is reduced.

Figure 7:
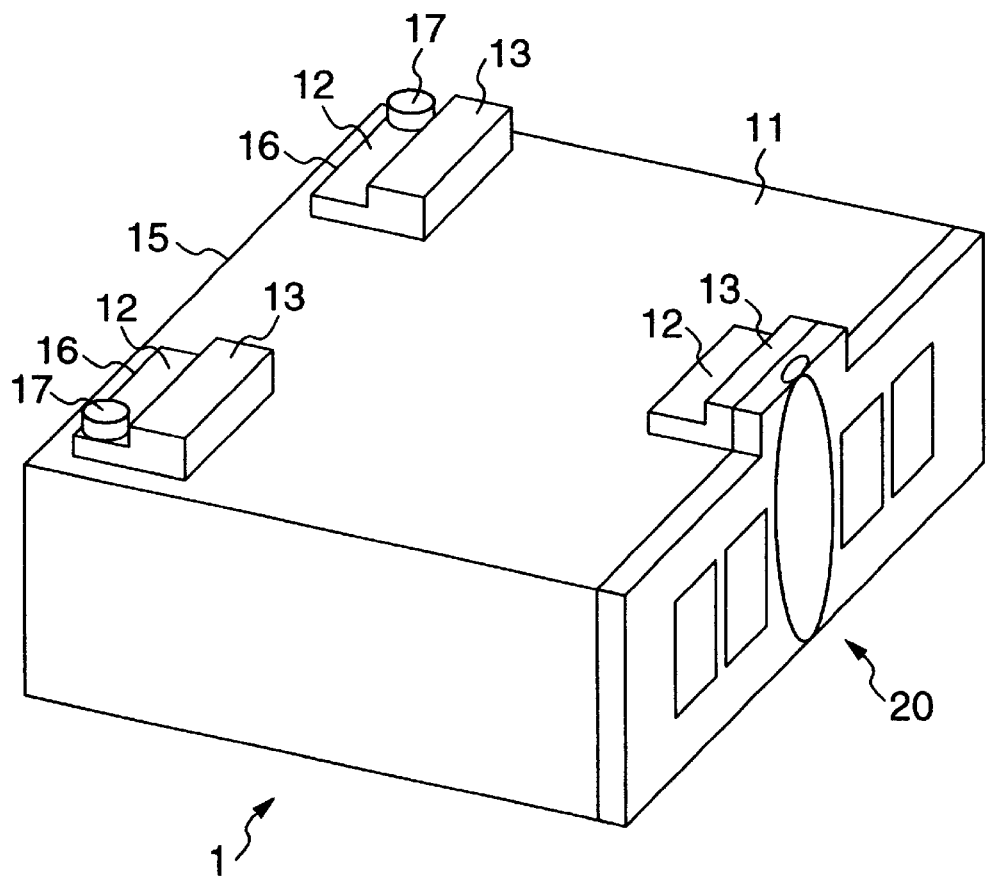
FIG. 7 is a perspective view of a second embodiment of a slider of the invention, showing a flying surface thereof.
Figure 8:
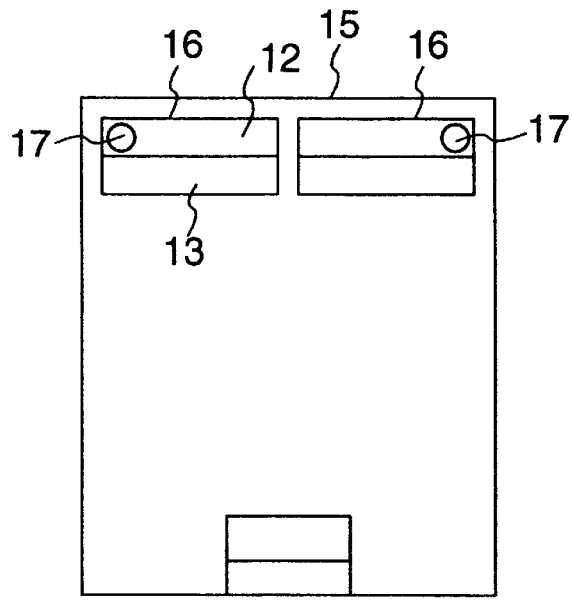
FIG. 8 is a front view of the second embodiment of the slider.

A second embodiment of the present invention will be described with reference to FIGS. 7 and 8. FIG. 7 is a perspective view of the second embodiment of a slider of the invention, showing a flying surface thereof. FIG. 8 is a plan view showing the flying surface of the slider of FIG. 7.

This embodiment differs from the first embodiment in that two inflow-side flying pads 10 are offset inwardly from opposite sides of the slider 1, respectively. As shown in FIG. 8, a front edge 16 of a step surface 12 of each inflow-side pad 10 is offset slightly rearward of a front edge 15 of the body of the slider 1. The outer side edge of each inflow-side flying pad 10 is offset inwardly from the corresponding side edge of the slider 1. With this arrangement, even if chipping occurs when sliders are cut one by one from a rectangular bar by machining, the configuration of the flying pads will not be changed by this chipping. Therefore, the efficiency of the production by machining can be enhanced. Similar effects as described above for the first embodiment are achieved also in this embodiment.

Figure 9:
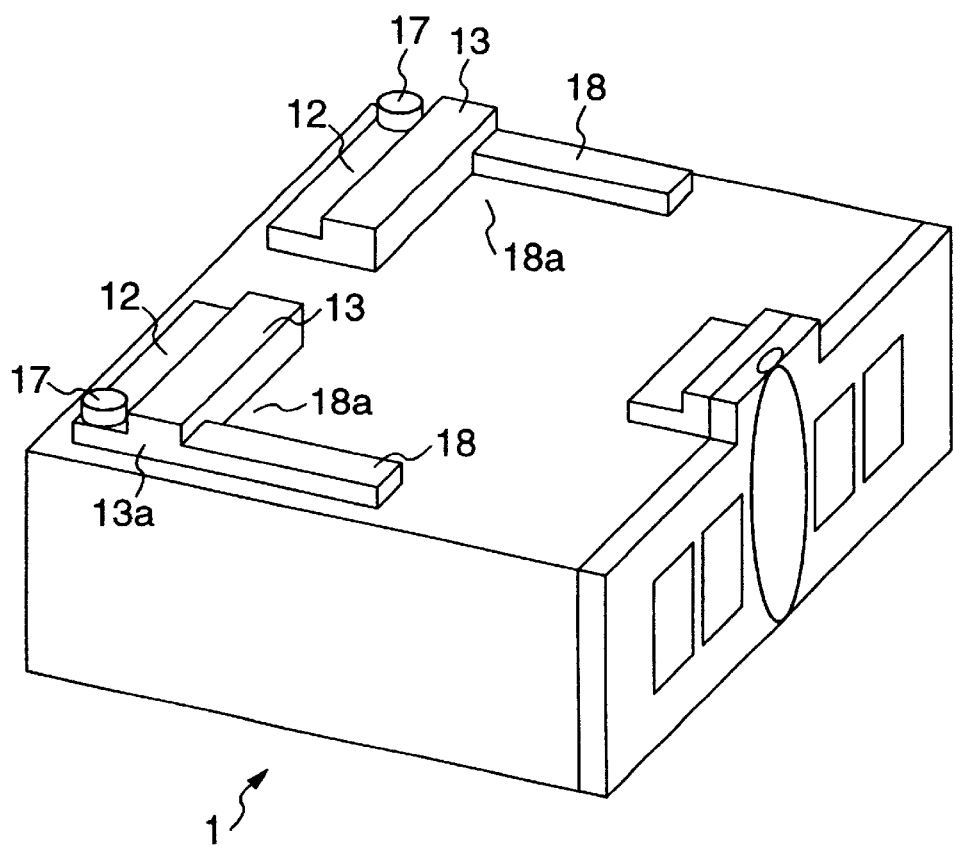
FIG. 9 is a perspective view of a third embodiment of a slider of the invention, showing a flying surface thereof.

A third embodiment of the present invention will be described with reference to FIG. 9. FIG. 9 is a perspective view of the third embodiment of a slider of the invention, showing a flying surface thereof.

This embodiment differs from the first embodiment in that a rear step surface 18 is formed at a rear side of each of two inflow-side flying pads 10. The rear step surfaces 18 are disposed in a plane in which step surfaces 12 lie, that is, the rear step surfaces 18 and the step surfaces 12 have the same height, and are provided along outer sides 13a of the pads. Because of the provision of the rear step surface 18, an air stream, flowing to a rear side of a flat surface portion 13, is limited, and that region, disposed at the rear side of the flat surface portion 13, forms a negative pressure-producing region 18a for producing a negative pressure. The negative pressure decreases with the decrease of the ambient pressure, and therefore even when the ambient pressure decreases, the amount of reduction of the flying height of the slider is small similarly with the effect of the negative pressure due to the microscopic projection 17. And besides, the amount of reduction of the flying height due to the decrease of the pressure is small when the negative pressure is large. Therefore, a variation of the flying height due to the decrease of the ambient pressure is smaller as compared with the first embodiment, and therefore there can be provided the slider of a higher reliability. And besides, similar effects as described above for the first embodiment can be expected.

Figure 10:
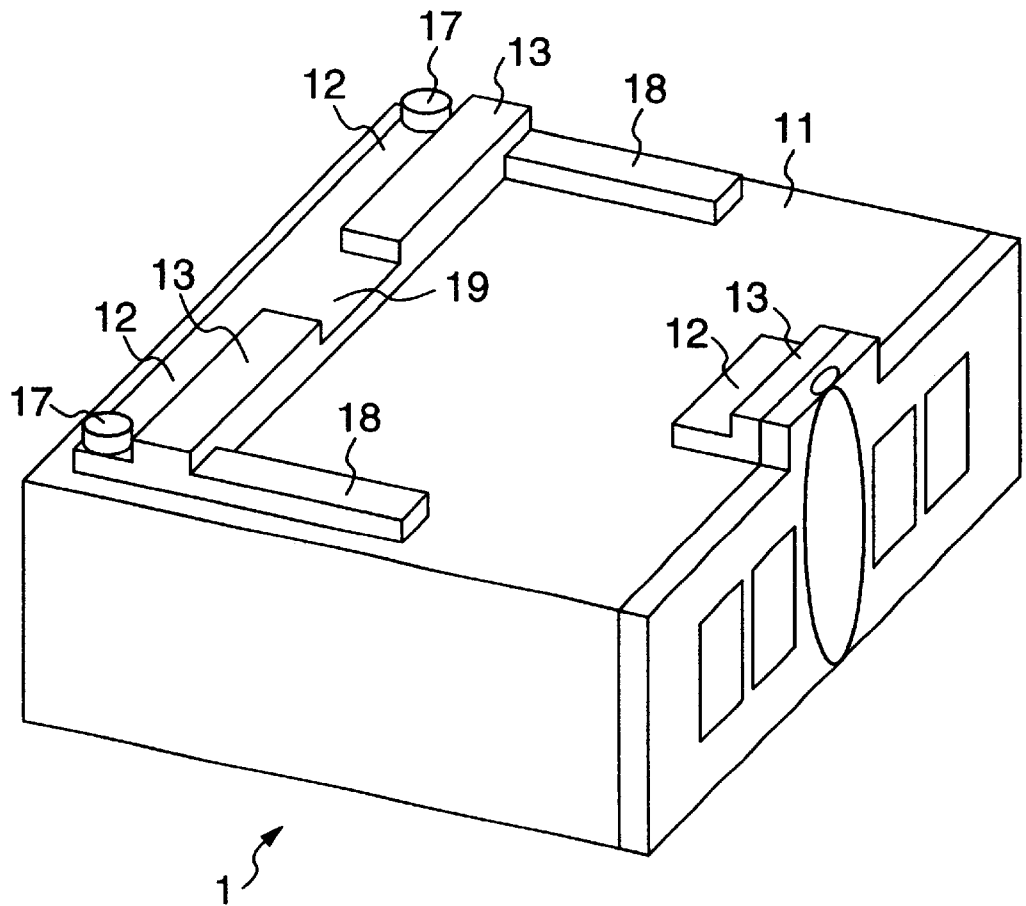
FIG. 10 is a perspective view of a fourth embodiment of a slider of the invention, showing a flying surface thereof.

A fourth embodiment of the present invention will be described with reference to FIG. 10. FIG. 10 is a perspective view of the fourth embodiment of a slider of the invention, showing a flying surface thereof.

This embodiment differs from the third embodiment in that step surfaces 12 of two inflow-side flying pads 10 are interconnected by a central step surface 19. Because of the provision of the central step surface 19, an air stream, flowing through a gap between the two flying pads, is limited, and a negative pressure is produced at a wide region disposed at the rear side of the flying pads. The depth from a flat surface 13 to a bleed surface 11 is set to 2 $\mu$m, thereby increasing the negative pressure. By adjusting this depth, the magnitude of the negative pressure can be adjusted. Therefore, the negative pressure can be more increased as compared with the third embodiment, and the amount of reduction of the flying height due to the decrease of the ambient pressure can be made smaller as compared with the third embodiment. With the increased negative pressure, a variation of the flying height due to the difference of the peripheral speed of the disk can be further reduced. And besides, similar effects as described above for the first embodiment can be expected.

Figure 11:
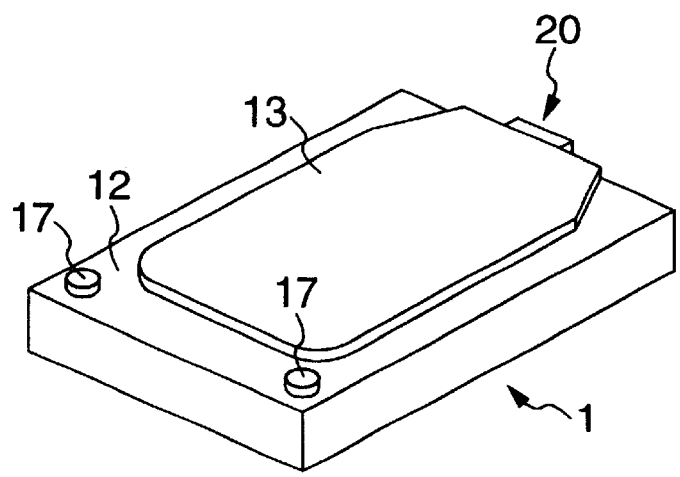
FIG. 11 is a perspective view of a fifth embodiment of a slider of the invention, showing a flying surface thereof.

A fifth embodiment of the present invention will be described with reference to FIG. 11. FIG. 11 is a perspective view of the fifth embodiment of a slider of the invention, showing a flying surface thereof.

This embodiment differs from the first embodiment in that only one flying pad, which is generally equal in size to a slider body, is provided on a slider. A step surface 12 is provided around a flat surface portion 13. In this embodiment, the step surface 12 is thus provided generally over the entire periphery of the flat surface portion 13, and with this construction, even when an air stream flows obliquely into the slider 1 (in this case, the slider is arranged at an angle relative to the direction of the periphery of the disk), a predetermined flying height can be obtained over the entire circumference of the disk since the step surface 12 produces a flying force. And besides, since the only one flying pad is provided on the slider, the compact design of the slider can be easily achieved. Furthermore, microscopic projections 17 as described above for the first embodiment are provided at the inflow-side portion of the step surface 12, and therefore similar effects as described above for the first embodiment can be expected.

Figure 12:
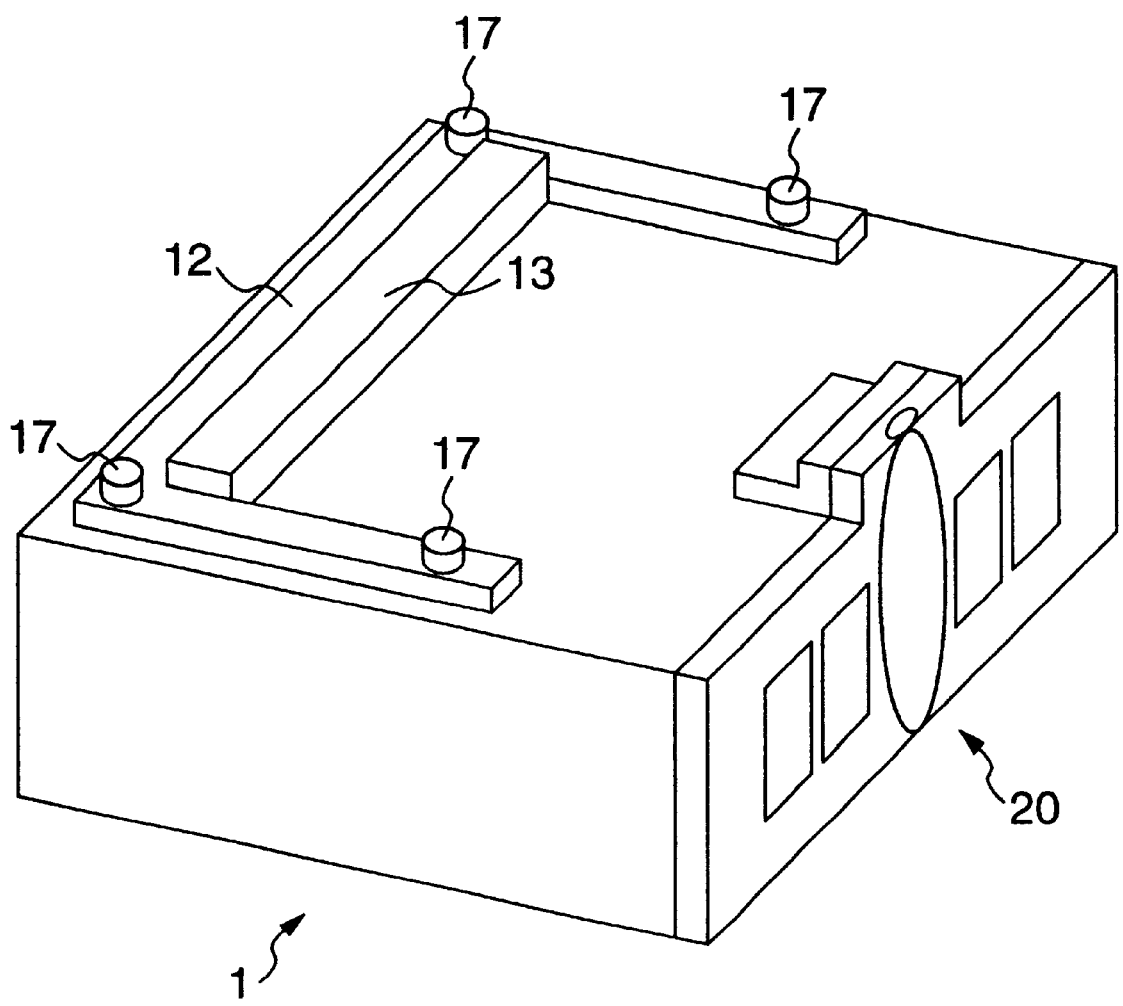
FIG. 12 is a perspective view of a sixth embodiment of a slider of the invention, showing a flying surface thereof.

A sixth embodiment of the present invention will be described with reference to FIG. 12. FIG. 12 is a perspective view of the sixth embodiment of a slider of the invention, showing a flying surface thereof.

This embodiment differs from the fourth embodiment in that rear step surfaces 18 extend rearward from opposite side surfaces of a flat surface portion 13, respectively, and that microscopic projections 17 are provided on the rear step surfaces 18, respectively. In this embodiment, the step surface 12 is provided generally over the entire periphery except a magnetic head-mounting surface, and with this construction even when an air stream flows obliquely into the slider 1, a predetermined flying height can be obtained over the entire circumference of the disk as in the fourth embodiment since the step surface 12 produces a flying force. And besides, by increasing the number of the microscopic projections 17, the effect of the negative pressure is enhanced, thereby achieving the slider having a more stable flying height. Furthermore, the microscopic projections 17 as described above for the first embodiment are provided at the inflow-side portion of the step surface 12, and therefore similar effects as described above for the first embodiment can be expected.

The number of the above-mentioned microscopic projections 17 is not limited to two, and an optimum number of microscopic projections 17 can be provided in so far as these projections do not adversely affect the flying force. The microscopic projections 17 are made of a material hard enough to withstand the contact and sliding contact between the magnetic disk 70 and the slider 1 and are formed by thin film process such as etching.

The microscopic projection 17 has a cylindrical shape, and with this configuration, the length of the edge of the microscopic projection for contact with the magnetic disk 70 is shorter as compared with the case where the microscopic projection has a rectangular shape. Therefore, the contact area is reduced, so that the sticking force is reduced. The distal end of the microscopic projection 17 is not limited to the flat surface, and in order to reduce the stress of contact with the magnetic disk, this distal end can be formed into a semi-spherical shape or a shape having a curvature.

The microscopic projections 17 can be easily formed by etching.

FIG. 13 shows a specific method of forming flying pads and microscopic projections 17.

Figure 13A:
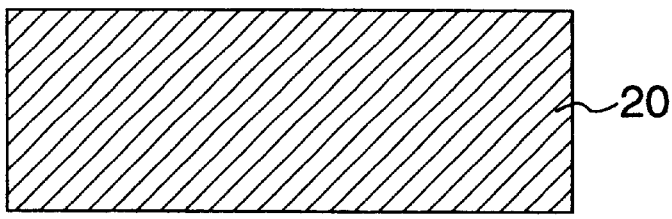
FIGS. 13A–13E is a view showing a method of forming a pad for flying.
Figure 13B:
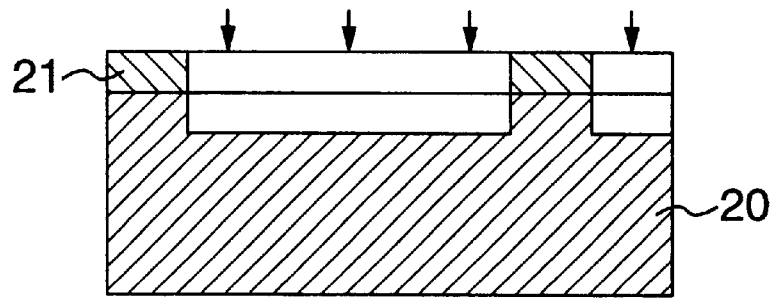
Figure 13C:
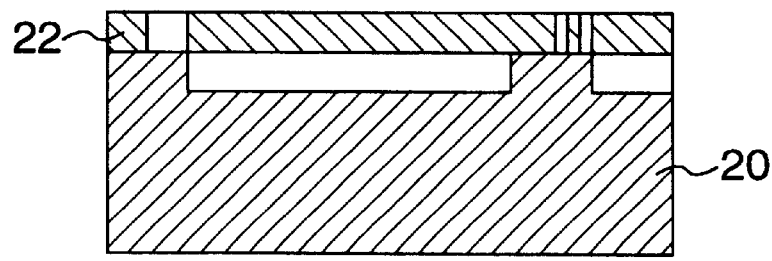
Figure 13D:
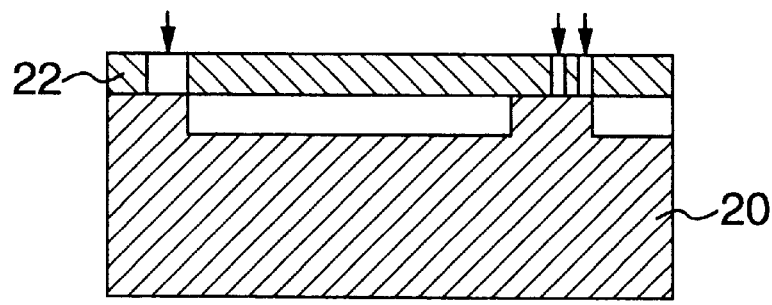

First, a first mask 21, shown in FIG. 13B, is placed on a slider substrate 20 shown in FIG. 13A, and the first-stage etching is effected, thereby forming flying pads. Then, a second mask 22, shown in FIG. 13C, is placed on the slider substrate 20, and the second-stage etching is effected as shown in FIG. 13D, thereby forming step surfaces 12 and microscopic projections 17. As a result, there is produced the slider in which the height Dp of the microscopic projections 17 is equal to the depth (height) Ds of the step surfaces 12. Namely, at this time, there is produced the slider having the microscopic projections 17 whose height is equal to a flat surface portion 13.

Figure 13E:
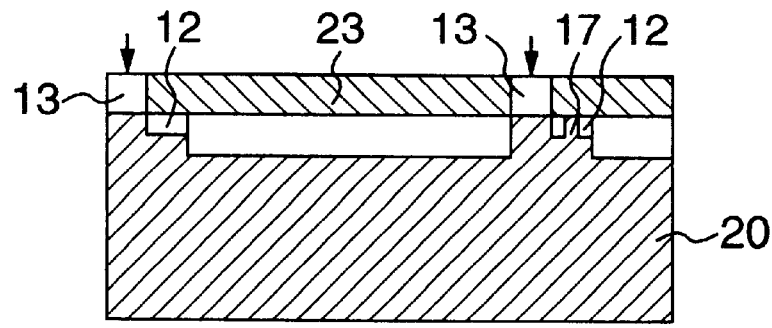

If it is desired that the height Dp of the microscopic projections 17 should be higher than the depth (height) Ds of the step surfaces 12 for the purpose of preventing the sticking, a third mask 23, shown in FIG. 13E, is placed on the slider, and the flat surface portions 13 are etched, and by doing so, this design can be obtained. In the type of magnetic disk device required to solve the sticking problem, such as one using a CSS system, the process up to the step of FIG. 13E must be performed.

Examples of this etching process includes a chemical etching process, such as laser inducing chemical etching and plasma etching, a physical etching process, such as reactive ion milling, and an electrochemical etching process such as electrolytic etching. By the use of these etching processes, the flying pads and microscopic projections of various shapes can be formed. And besides, the depth of the step surfaces and the height of the microscopic projections can be adjusted.

In this method, although the microscopic projections 17 are made of the same material as that of the slider substrate 20, these projections can be formed by carbon, diamond-like carbon, or hydrogen- or nitrogen-added carbon, using a similar thin film process. The wear resistance of the microscopic projections 17 can be enhanced by the use of these materials. Further, protective films can be formed respectively on the flat surface portions 13 and microscopic projections 17 for contact with the disk 70, and by doing so, the wear resistance can be enhanced. Because of the enhanced wear resistance, the lifetime of the flat surface portions 13 and microscopic projections 17 can be increased, and also the amount of production of dust can be reduced, so that the reliability of the device is enhanced. The above protective films are formed by vapor deposition, sputtering, CVD (chemical vapor deposition) and so on.

Figure 14:
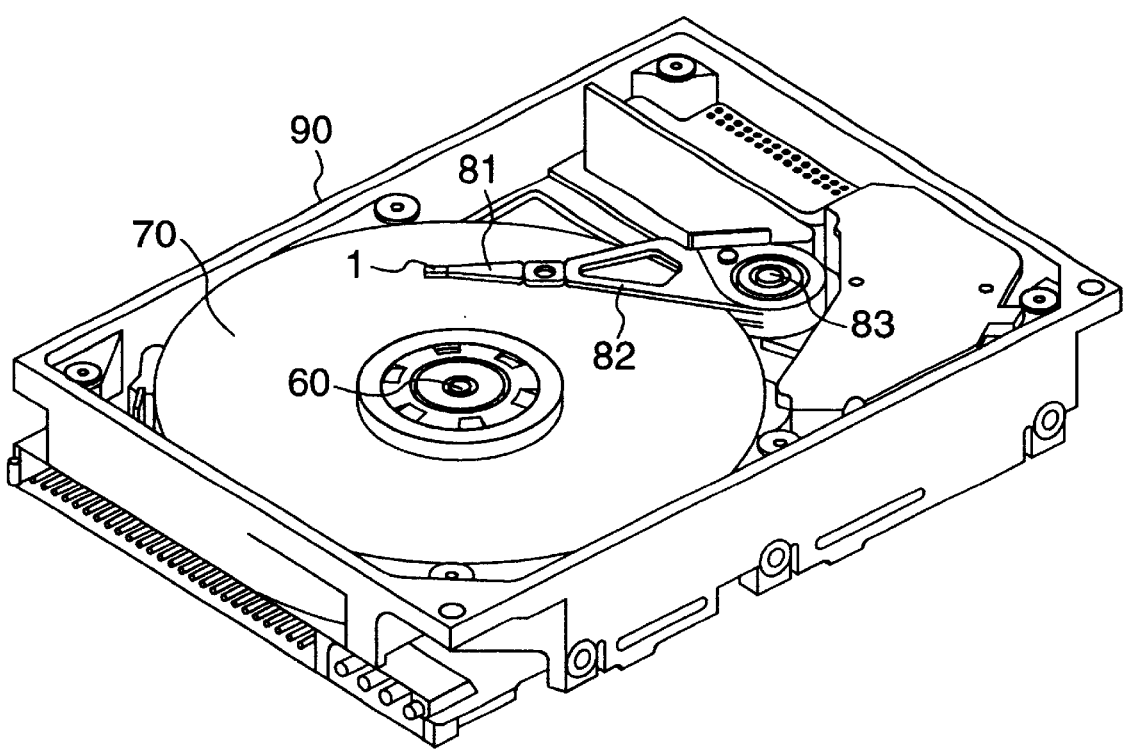
FIG. 14 is a perspective view of a magnetic disk device incorporating a magnetic head slider of the invention.

FIG. 14 shows a magnetic disk device including a magnetic head slider of the present invention.

The magnetic head slider (hereinafter referred to merely as "slider") 1 is supported by a suspension 81, and the suspension 81 is connected to a guide arm 82. The guide arm 82 is pivotally moved about an axis of a pivot bearing 83 by a voice coil motor 84, thereby moving the slider 1 to a desired radial position on a magnetic disk 70 rotated by a spindle motor 60. In this manner, the magnetic head slider 1 reads and write data relative to the magnetic disk 70. These mechanisms are sealed by a base 90 and a cover (not shown).

Although the magnetic disk device of this embodiment employs a CSS system, the slider of the present invention can be mounted on a magnetic disk device using a load-unload system in which when the rotation of the disk is stopped, the slider 1 is taken refuge from the disk 70.

The magnetic head slider of the present invention is effective particularly for a smooth magnetic disk in which the surface roughness of the magnetic disk surface is small.

More specifically, in order to achieve a surface recording density of not less than 10 Gb/inch$^2$, it is necessary to reduce the flying height of the slider to not more than 20 nm, and in order to achieve this, it is necessary to reduce the mean surface roughness Ra of the magnetic disk to not more than 2 nm.

The mean surface roughness Ra is measured by using a surface roughness meter of the tracer type, and the surface is measured over a length of 1 mm, and the measurement is effected at a cut-off frequency of 25 Hz while ignoring 0.1 mm-long opposite end portions of this length. In the measurement using AFM (Atomic Force Microscope), the measurement is effected over a square area (10 $\mu$m×10 $\mu$m).

In the case of a smooth disk having Ra ($\leq$2 nm), even when the flying slider is brought into contact with the magnetic disk surface for some reason, the friction coefficient is large, and therefore with the conventional slider, a large frictional force F is produced. When the value of F becomes large, the conventional slider can be easily turned and leaned forward to damage the magnetic disk surface. On the other hand, in the present invention, even if the mean surface roughness Ra of the magnetic disk is less than 2 nm (Ra<2 nm), only the microscopic projections, formed on the slider, are brought into contact with the magnetic disk surface, and the corner portion of the slider will not be brought into contact with the magnetic disk surface, and therefore the disk surface will not be damaged. Therefore, there can be provided the slider having the low flying height and high reliability, and also the magnetic disk of a large capacity can be achieved.

As described above, even if the magnetic head slider of the present invention is brought into contact with the rotating magnetic disk for some reason at the time of CSS or during the flying of the slider, the slider is less liable to lean forward, and even if the slider leans forward, the front edge of the step surface will not damage the magnetic disk surface. And besides, even if the ambient atmospheric pressure decreases, the predetermined flying height can be achieved. Furthermore, using this slider in combination with the smooth disk, the magnetic disk device of a large capacity and high reliability can be achieved.

What is claimed is:

1. A magnetic head slider comprising a magnetic head for reading/writing information from/into a magnetic disk and a slider on which the magnetic head is mounted, wherein said slider has three surface portions with levels which are different from each other on a surface facing to the magnetic disk upon read/write operation of the magnetic head slider, said three surface portions including a first surface portion forming a pad surface, a second surface portion having a level which is lower than a level of the first surface portion and a third surface portion having a level which is lower than the level of the second surface portion, said second surface portion being provided at a side opposite to a side on which the magnetic head is mounted with respect to said first surface portion, and said third surface portion being provided at the side on which the magnetic head is mounted with respect to said first surface portion, and wherein a projection is provided on said second surface portion.

2. A magnetic head slider according to claim 1, wherein two first surface portion are provided in a width direction of the slider.

3. A magnetic head slider according to claim 2, wherein said second surface portion is extended to said two first surface portions.

4. A magnetic head slider according to claim 1, wherein said second surface portion is extended beyond both ends of said first surface portion.

5. A magnetic head slider according to claim 1, wherein a difference in the levels of the first surface portion and the second surface portion is less than 300 nm.

6. A magnetic head slider according to claim 1, wherein a level of said projection is higher than the level of the first surface portion.

7. A magnetic head slider according to claim 1, wherein said projection is a cylindrical shape.

8. A magnetic head slider according to claim 1, wherein said projection has a planar end surface.

9. A magnetic head slider according to claim 1, wherein said projection has a curved end surface.

10. A magnetic head slider comprising a magnetic head for reading/writing information from/into a magnetic disk and a slider on which the magnetic head is mounted, wherein said slider has a plurality of flying pads on a surface facing to the magnetic disk upon reading/writing operation of the magnetic slider, said plurality of flying pads including two flying pads provided at an air-inflow side of the slider and at least one flying pad provided at an air-outflow side of the slider, said flying pads each comprising a first flat surface portion, and a second flat surface portion having a level which is lower than a level of the first flat surface portion and is provided at an air-inflow side with respect to said first flat surface portion, and said air-inflow side flying pads each having a projection with a level which is higher than the level of the first flat surface portion and provided in the vicinity of an outer corner of said second flat surface portion.

11. A magnetic head slider according to claim 10, wherein said air-inflow side flying pads are offset inwardly from opposite sides and the air-inflow side of the slider.

12. A magnetic head slider according to claim 11, wherein rear step surface portions having a level which is the same as the level of said second flat surface portion are provided along outer sides of the slider.

13. A magnetic head slider according to claim 12, wherein a central step surface portion having a level which is the same as the level of said second flat surface portion and interconnecting said second flat surface portion is provided between said air-inflow side flying pads.

14. A magnetic head slider according to claim 10, wherein said at least one flying pad provided at an air-outflow side of the slider includes one flying pad provided at a center in a widthwise direction of the slider.

15. A magnetic head slider according to claim 10, wherein the magnetic head is provided on the flying pad provided at an air-outflow side of the slider.

16. A magnetic head slider comprising a magnetic head for reading/writing information from/into a magnetic disk and a slider on which the magnetic head is mounted, wherein said slider has a plurality of flying pads on a surface facing to the magnetic disk upon reading/writing operation of the magnetic slider, said plurality of flying pads including one flying pad provided at an air-inflow side of the slider and at least one flying pad provided at an air-outflow side of the slider, said air-inflow side flying pad including a first flat surface portion extending in the widthwise direction of the slider, a second flat surface portion having a level which is lower than a level of the first flat surface portion and provided at an air-inflow side with respect to the first flat surface portion and extended along outer sides of the slider beyond the first flat surface portion, and projections provided in the vicinity of outer corners of the second flat surface portion and extensions of the second flat surface portion.

17. A magnetic head slider according to claim 16, wherein the at least one flying pad provided at an air-outflow side of the slider includes one flying pad provided at a center in a widthwise direction of the slider.

18. A magnetic head slider according to claim 16, wherein the magnetic head is provided on the flying pad provided at an air-outflow side of the slider.

* * * * *